Oct. 19, 1948.  E. E. NELSON  2,451,689
VALVE ASSEMBLY FOR HYDRAULIC STEERING SYSTEMS
Filed March 16, 1946  2 Sheets-Sheet 1
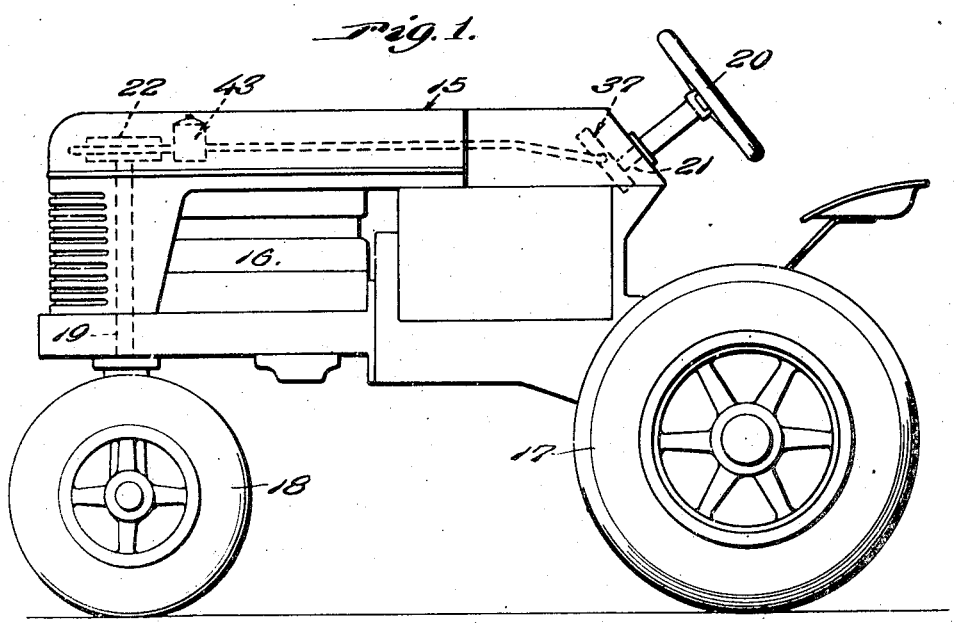
Fig. 1.
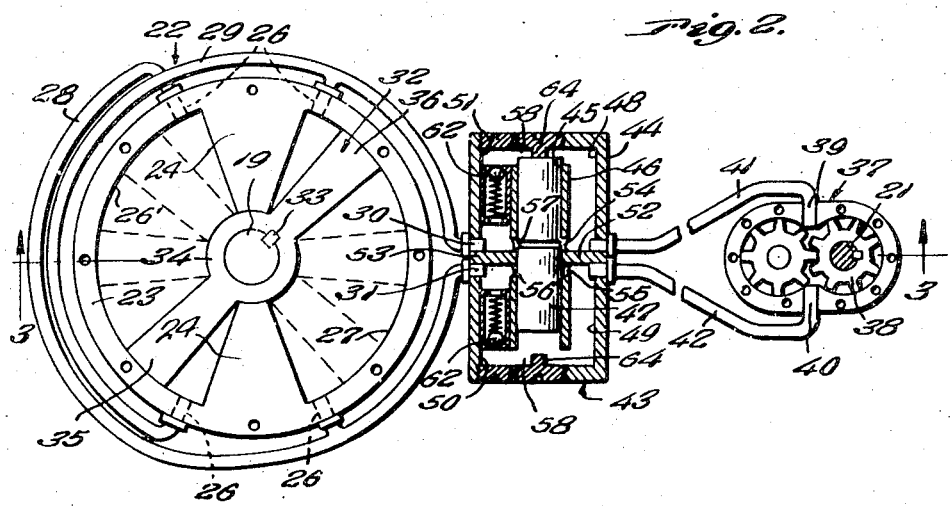
Fig. 2.
Fig. 7.
Inventor
Everett E. Nelson
By Clarence A. O'Brien
and Harvey B. Jackson
Attorneys Oct. 19, 1948.  E. E. NELSON  2,451,689
VALVE ASSEMBLY FOR HYDRAULIC STEERING SYSTEMS
Filed March 16, 1946  2 Sheets-Sheet 2
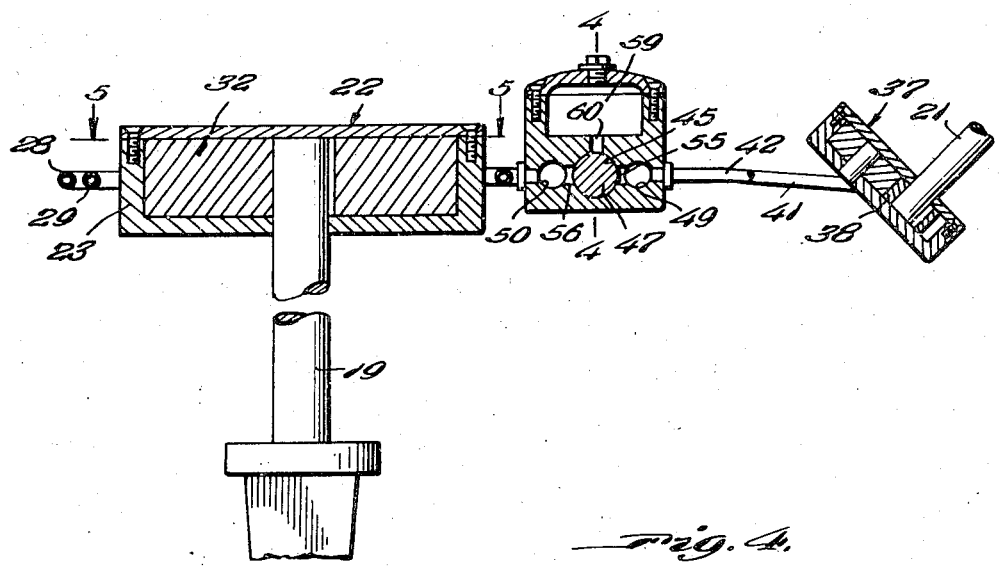
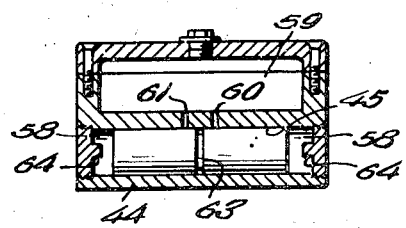
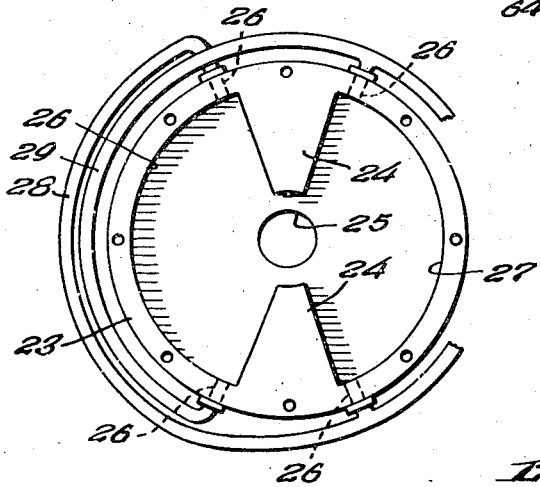
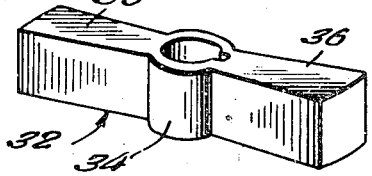
Inventor
Everitt E. Nelson
By Clarence A. O'Brien
and Harvey B. Jackson
Attorneys Patented Oct. 19, 1948

2,451,689

UNITED STATES PATENT OFFICE 2,451,689

VALVE ASSEMBLY FOR HYDRAULIC STEERING SYSTEMS

Everett E. Nelson, Litchfield, Minn.

Application March 16, 1946, Serial No. 654,911

2 Claims. (Cl. 137—69)

1

This invention relates to a valve for an hydraulic steering system and has for its primary object to relieve the operator of a power driven vehicle from the strain ordinarily encountered due to the transmission of road shocks to the steering wheel.

Another object is to insure instantaneous response of the guiding wheels of a vehicle to a turn of the steering wheel.

A further object is to facilitate the equipment of vehicles, such as farm tractors with hydraulic steering gears.

The above and other objects may be attained by employing this invention which embodies among its features a valve for an hydraulic system having two separate chambers, a fluid reservoir carried by the valve body and fluid pressure responsive means operable in said body for establishing communication between the reservoir and one or the other of said chambers.

In the drawings:

Figure 1 is a side view of a farm tractor equipped with an hydraulic steering system embodying the features of this invention, Figure 2 is a diagrammatic plan view of this improved hydraulic steering system, Figure 3 is a longitudinal sectional view taken substantially along the line 3—3 of Figure 2, Figure 4 is an enlarged transverse sectional view taken substantially along the line 4—4 of Figure 3, Figure 5 is a horizontal sectional view taken substantially along the line 5—5 of Figure 3, Figure 6 is a perspective view of the vaned piston or rotor connected to the column upon which the guiding wheels are mounted, and Figure 7 is a perspective view of the plunger used in the valve.

Referring to the drawings in detail a tractor designated generally 15 is provided with the conventional power plant 16 which has driving connection with the traction wheels 17, all in the ordinary manner. The front end of the tractor is supported on the guiding wheels 18 which are mounted on a transversely extending axle carried at the lower end of a vertically extending rotatably mounted king pin or post 19 to the upper end of which the steering motor of my system is connected. The tractor is provided with a conventional steering wheel 20 which is mounted on a steering shaft 21, to the lower end of which is attached the fluid pump of my steering system.

The steering motor which I employ is designated generally 22 and comprises a hollow cylindrical body or case 23 provided with diametrically opposed inwardly projecting radial hydraulic abutments 24 and provided in one end wall with a concentric opening 25 (Fig. 5) through which the upper end of the king pin or shaft 19 extends. Formed adjacent opposite faces of each abutment

2

24 in the side wall of the casing or cylinder 23 are radial ports 26, the purpose of which will be more fully hereinafter explained.

It will thus be seen the case 23 is partitioned by the radial abutments 24 into two separate arcuate chambers 26' and 27 adjacent opposite ends of which the ports 26 open. An arcuate pipe or manifold 28 is connected to diametrically opposed ports 26 so that fluid admitted to the chambers 26' and 27, will simultaneously enter the chambers in a direction to cause the rotor, to be more fully hereinafter described, to rotate counterclockwise. A similar manifold or pipe 29 connects the ports 26 on the opposite sides of the abutments 24, and these manifolds 28 and 29 are respectively connected through nipples 30 and 31 to the outlet ports of my improved control valve to be more fully hereinafter explained. Rotatably mounted in the cylindrical casing 22 is a rotary piston designated generally 32 which is keyed or otherwise secured as at 33 to the upper end of the king pin or shaft 19. The piston or rotor 32 comprises a hub member 34 carrying diametrically opposed vanes 35 and 36 so that when fluid pressure is admitted to one of the chambers 26' or 27 the rotor 32 will rotate within the case 23.

In order to provide a driving force for introducing fluid into the chambers 26' and 27 I provide a fluid pump designated generally 37 of conventional gear pump form, to one impeller 38 of which is keyed the shaft 21 so that when the steering wheel 20 is rotated the pump will be actuated according to the direction of movement of the steering wheel. The pump 37 is provided with the conventional ports 39 and 40 to which pipes 41 and 42 respectively are connected. These pipes 41 and 42 lead respectively to the nipples 30 and 31 through an automatic fluid pressure actuated valve to be more fully hereinafter described.

My improved control valve is designated generally 43 and comprises a body 44 which is formed with a longitudinal bore 45 to form a cylinder 46 in which a piston or plunger 47 is mounted to slide. Formed in the body 44 on opposite sides of the bore 45 are spaced parallel bores 48, 49, 50 and 51, the bores 48 and 49 being separated from one another by a transversely extending partition wall 52 while a similar partition wall 53 separates the bores 50 and 51. These walls 52 and 53 are located midway of the length of the case 44 as will be readily understood upon reference to Figure 2. A port 54 establishes communication between the innermost end of the bore 48 and the cylinder bore 45 and a similar port 55 establishes communication between the innermost end of the bore 49 and of the bore 45, likewise ports 56 and 57 establish communication between the innermost ends of the bores 50 and 51 and the bore 45 adjacent the partition wall 53, while the opposite ends of the bores 45, 48, 49, 50 and 51 communicate with one another through chambers 58. Carried on the upper side of the body or case 44 is an enclosure forming a fluid reservoir 59 (Fig. 3) which communicates through ports 60 and 61 with the cylinder 45 in the same planes as the ports 54 and 57 and 55 and 56 respectively. The nipple 30 of the pipe 29 enters the bore 51 at a point diametrically opposite the port 57 while the pipe 41 enters the bore 48 diametrically opposite the port 54. The nipple 31 enters the bore 50 diametrically opposite the port 56 and the pipe 42 enters the bore 49 diametrically opposite the port 55. Suitable check valves 62 are arranged in the bores 50 and 51 in such a manner as to permit fluid to flow from their outermost ends toward the ports 56 and 57, but are designed to arrest flow of fluid through these bores in the opposite direction. Formed in the plunger 47 midway of its length is an annular groove 63 which when the plunger is in one position establishes communication between the bores 54, 61 and 67 and when in the reverse position, the plunger 47 establishes communication between the bores 55, 56 and 60. Stops 61 are carried at opposite ends of the cylinder bore 45 to limit the length of stroke of the plunger 47 therein in order to cause the groove 63 to align with the ports as previously described, and also to hold the ends of the piston or plunger in spaced relation to the end walls of the cylinder 46.

In operation it will be understood that as the steering wheel 20 is rotated the pump 37 will force fluid contained therein through one or the other of the pipes 41 or 42. Assuming that the flow is through pipe 42 pressure will be created in the bore 49 to force the piston or plunger 47 into the position shown in Figure 2. Such motion of the piston moves the annular groove 63 into alignment with the ports 54, 57 and 61 so that fluid will be free to flow from the chambers 26' and 27 through the pipe 29 and the nipple 30 into the bore 51 of the valve 43. The continued movement of the steering wheel will cause the fluid to enter the port 57 and pass around the groove 63, to leave the port 54 and be discharged into the bore 48 from whence it is extracted by means of the pipe 41 and delivered to the pump 37. In the meantime the force of the fluid against the valve 62 in the bore 50 will cause the valve to open and permit the flow of fluid through the nipple 31 into the pipe 28 and from thence through the ports 26 on the side of the rotor 32 opposite that from which the fluid is being extracted. Such flow of fluid will cause the vanes 35 and 36 to move in their respective chambers and rotate the shaft or king pin 19. In order to assure the flow of fluid in sufficient volume through the pump 37 to actuate the motor 22, fluid may be extracted through the port 61 and the groove 63 to enter the port 54 and be discharged into pipe 41. At the same time any excess fluid leaving the chambers 26' and 27 will be discharged through the nipple 30 and may enter the port 57 and flow upwardly through the groove 63 and port 61 into the chamber or reservoir 59.

Obviously upon reversing the direction of motion of the steering wheel 20 the reverse action will take place with the plunger 47 passing through a neutral position at which the groove 63 therein will be located midway between the passages 54 and 55. When in this position, it will be obvious that no reverse flow of fluid through the steering motor and valve can take place and hence, road shocks cannot be transmitted to the steering wheel 20.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. An automatic valve for an hydraulic system comprising a valve body having a longitudinal bore throughout its length forming a cylinder and spaced parallel bores on opposite sides of the cylinders, a partition wall separating the spaced parallel bores into longitudinally spaced chambers, an hydraulic fluid reservoir in the valve body above the bore and chambers, the bottom wall of the reservoir having a port adjacent each side of the partition wall establishing communication between the reservoir and the cylinder, the cylinder having ports adjacent the partition establishing communication with the respective longitudinally spaced chambers, check valves in the longitudinally spaced chambers in one of the spaced parallel bores on one side of the cylinder to permit flow of fluid toward respective ports, each spaced parallel bore having a wholly open port adjacent the partition wall and communicating at its opposite end with the cylinder, and a plunger slidable in the cylinder and having a groove midway of its length selectively to open or close the first and second mentioned ports.

2. An automatic valve for an hydraulic system comprising a valve body having a longitudinal bore throughout its length forming a cylinder and spaced parallel bores on opposite sides of the cylinders, a partition wall separating the spaced parallel bores into longitudinally spaced chambers, an hydraulic fluid reservoir in the valve body above the bore and chambers, the bottom wall of the reservoir having a port adjacent each side of the partition wall establishing communication between the reservoir and the cylinder, the cylinder having ports adjacent the partition establishing communication with the respective longitudinally spaced chambers, check valves in the longitudinally spaced chambers of one of the spaced parallel bores on one side of the cylinder to permit flow of fluid toward their respective ports, each spaced parallel bore having a wholly open port adjacent the partition wall and communicating at its opposite end with the cylinder, a plunger slidable in the cylinder and having a groove midway of its length selectively to open or close the first and second mentioned ports and a stop at each end of the cylinder to hold the end of the piston in spaced relation to the respective end of the cylinder.

EVERETT E. NELSON.

REFERENCES CITED

The following references are of record in the file of this patent:

UNITED STATES PATENTS

| Number | Name | Date |
| --- | --- | --- |
| 870,806 | Turner | Nov. 12, 1907 |
| 1,403,756 | Farmer | Jan. 17, 1922 |
| 2,020,951 | Lemon | Nov. 12, 1935 |
| 2,361,774 | Koons | Oct. 31, 1944 |